(12) United States Patent
Disanto et al.

(10) Patent No.: US 9,403,927 B2
(45) Date of Patent: Aug. 2, 2016

(54) PROCESS FOR THE PRODUCTION OF A POLYMER IN A GAS PHASE FLUIDISED BED REACTOR

(71) Applicant: INEOS EUROPE AG, Rolle (CH)

(72) Inventors: Damien Disanto, Ensues (FR); Jean-Louis Chamayou, Carry le Rouet (FR); Arnaud Soulage, Martigues (FR)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 14/433,919

(22) PCT Filed: Oct. 7, 2013

(86) PCT No.: PCT/EP2013/070799
§ 371 (c)(1),
(2) Date: Apr. 7, 2015

(87) PCT Pub. No.: WO2014/060231
PCT Pub. Date: Apr. 24, 2014

(65) Prior Publication Data
US 2015/0252128 A1    Sep. 10, 2015

(30) Foreign Application Priority Data
Oct. 16, 2012  (EP) ..................................... 12188680

(51) Int. Cl.
*C08F 2/34* (2006.01)
*C08F 2/38* (2006.01)
*C08F 210/16* (2006.01)
*C08F 10/02* (2006.01)
*C08F 2/00* (2006.01)
*C08F 210/02* (2006.01)

(52) U.S. Cl.
CPC ................ *C08F 210/16* (2013.01); *C08F 2/001* (2013.01); *C08F 2/34* (2013.01); *C08F 10/02* (2013.01); *C08F 210/02* (2013.01); *C08F 2400/02* (2013.01)

(58) Field of Classification Search
CPC .......... C08F 2/001; C08F 2/34; C08F 2400/02
USPC ......................................................... 526/73
See application file for complete search history.

(56) References Cited

U.S. PATENT DOCUMENTS

| | | | |
|---|---|---|---|
| 5,306,792 A | 4/1994 | Havas et al. | |
| 6,265,502 B1 | 7/2001 | Herzog | |
| 6,348,635 B1 | 2/2002 | Herzog | |
| 6,455,642 B1 | 9/2002 | Myhre et al. | |
| 6,501,917 B1 | 12/2002 | Karasawa | |
| 6,642,323 B1 | 11/2003 | Myhre et al. | |
| 7,332,549 B2 | 2/2008 | Selo | |
| 7,834,107 B2 | 11/2010 | Köppl et al. | |
| 2002/0077139 A1 | 6/2002 | Bouet | |

FOREIGN PATENT DOCUMENTS

| | | |
|---|---|---|
| CN | 1059531 A | 3/1992 |
| CN | 1134708 A | 10/1996 |
| CN | 1284967 A | 2/2001 |
| CN | 1308644 A | 8/2001 |
| CN | 1311801 A | 9/2001 |
| CN | 1121419 C | 9/2003 |
| CN | 100500706 C | 6/2009 |
| CN | 102257017 A | 11/2011 |
| EP | 0 180 420 A1 | 5/1986 |
| WO | WO 2010/071798 A1 | 6/2010 |

OTHER PUBLICATIONS

Chemical Engineering Design, vol. 16, No. 4, pp. 9-13 (2006).
Petrochemical Technology & Application, vol. 26, No. 5, 6 pgs. (2008).
State Intellectual Property Office of People's Republic China Search Report; Application No. 201380054111.4, filed Oct. 7, 2013 (3 pgs.).

*Primary Examiner* — Fred M Teskin
(74) *Attorney, Agent, or Firm* — Nixon & Vanderhye P.C.

(57) ABSTRACT

Method for operating a process for producing a polymer by polymerization of a monomer and an optional comonomer in a gas phase fluidized bed reactor during steady-state and non-steady-state conditions.

20 Claims, 8 Drawing Sheets

PROCESS FOR THE PRODUCTION OF A POLYMER IN A GAS PHASE FLUIDISED BED REACTOR

This application is the U.S. national phase of International Application No. PCT/EP2013/070799 filed Oct. 7, 2013 which designated the U.S. and claims priority to European Patent Application No. 12188680.8 filed Oct. 16, 2012, the entire contents of each of which are hereby incorporated by reference.

The present invention relates to a method for the operation of a process for the production of a polymer by polymerisation of a monomer and an optional comonomer in a gas phase fluidised bed reactor during steady-state and non-steady-state conditions. In particular, the present invention relates to a process for the continuous production of a medium and/or high density ethylene (co-)polymer in a gas phase fluidised bed reactor comprising improved non-steady-state conditions.

BACKGROUND OF THE INVENTION

The polymerisation of olefins in gas phase fluidised bed reactors is well-known. Control of such processes is required to ensure stable fluidisation and stable production of polymer with desired characteristics. One particular problem which can occur is the formation of agglomerates. As well as control during steady-state it is also important to control the process during periods of non-steady-state operation, such as during start-ups.

At non-steady-state conditions it can be especially difficult to avoid the presence of agglomerates because it is especially difficult to control the density and melt index of polymer it is desired to produce.

A number of applications have attempted to address such problems during start-ups and at steady state.

WO 99/31143, for example, relates to a process for starting-up a polymerisation process in a gas phase fluidised bed which uses a catalyst based on chromium oxide. In the process described in this document the start-up involves two separate stages, the first in which olefin is introduced so as to maintain a constant partial pressure in the reactor, and the second in which olefin is introduced at a constant flow rate.

WO 99/31142 also relates to a process for starting-up a polymerisation process in a gas phase fluidised bed, but this time using a Ziegler-Natta type catalyst. In the process described in this document the start-up involves increases in the partial pressure of olefin and the rate of introduction of catalyst, whilst maintaining constant the ratios of the partial pressures of the olefin to hydrogen and to any comonomers.

WO 02/51027 relates to a start-up procedure for processes using at least two different catalyst compounds. The procedure involves calculating a trajectory, from elements including catalyst deactivation rate constants (kd), for the rate of introduction of a catalyst system, into a reactor, and introducing the olefin monomer, a catalyst system, optional comonomer, and optional chain transfer or termination agents into a polymerization reactor in a manner such that the catalyst system introduction rate is manipulated to follow the trajectory until a desired production rate is achieved. WO02/51027 teaches to keep constant throughout start-up and polymerisation the ratios of comonomer and hydrogen to ethylene.

WO2005007711 relates to a process for the polymerisation or copolymerisation in the gas phase of ethylene, which process comprises a pre start-up operation characterized in that, prior to the introduction of the catalytic system in the reactor, the start-up bed is heated at a high temperature.

U.S. Pat. No. 5,534,607 and U.S. Pat. No. 5,306,792 relate to operation of processes operating at steady state. In particular, U.S. Pat. No. 5,534,607 relates to a continuous process for polymerisation of an alpha-olefin using a Ziegler-Natta type catalyst in which the reactor is fed with alpha-olefin at a constant rate and U.S. Pat. No. 5,306,792 relates to a continuous process for polymerisation of an alpha-olefin using a catalyst based on chromium oxide in which the reactor is fed with alpha-olefin and catalyst at constant rates.

SUMMARY OF THE INVENTION

An improved method has now been found for a polymerisation process where a monomer and an optional comonomer are being consumed where under non-steady-state condition the polymerisation process is operated under strict conditions.

Thus, in a first aspect, the present invention provides a process for the continuous production of a medium and/or high density ethylene (co-)polymer in a gas phase fluidised bed reactor at an operating temperature ("Top") higher than 90° C., preferably higher than 95° C., under a selected ratio of the partial pressure of hydrogen to the partial pressure of ethylene (pH2/pC2="RHop"), and under a selected ratio of the partial pressure of comonomer to the partial pressure of ethylene (pComo/pC2="RCoop"), comprising non-steady-state operations made of at least two consecutive sequences wherein the first sequence takes place before catalyst introduction and consists in preparing the fluidised bed reactor comprising a charge powder at a reactor temperature "Tsu" lower than 90° C., under a ratio of the partial pressure of hydrogen to the partial pressure of ethylene ("RHsu"), and under a ratio of the partial pressure of comonomer to the partial pressure of ethylene ("RCsu"), characterised in that RHsu is higher than RHop, preferably higher than 1.1× RHop, and RCsu is higher than RCoop, preferably higher than 1.1×RCoop, and, in a subsequent second sequence, the catalyst is introduced and the ratios of ethylene partial pressure to hydrogen partial pressure and of ethylene partial pressure to comonomer partial pressure are increased until steady-state conditions, i.e.

the reactor temperature "T" reaches "Top", the ratio of the partial pressure of hydrogen to the partial pressure of ethylene RH reaches RHop, and the ratio of the partial pressure of comonomer to the partial pressure of ethylene RC reaches RCoop.

T=reactor temperature
pH2=partial pressure of hydrogen
pC2=partial pressure of ethylene
pComo=partial pressure of comonomer
Top=reactor operating temperature (under steady-state conditions)
RHop=reactor operating hydrogen to ethylene partial pressure ratio (under steady-state conditions)
RCoop=reactor operating comonomer to ethylene partial pressure ratio (under steady-state conditions)
Tsu=reactor temperature during the first sequence
RHsu=reactor operating hydrogen to ethylene partial pressure ratio during the first sequence
RCsu=reactor operating comonomer to ethylene partial pressure ratio during the first sequence According to the present invention, the term "non-steady state" refers to periods/operation both before catalyst injection and during which the production rate of polymer changes or the periods/operation during which the polymer properties of the polymer being produced changes (mainly density but also melt index or both).

In contrast, at "steady-state" the aim is to maintain a substantially constant hourly production of polymer and a substantially constant property of the polymer being made (in particular density and melt Index).

It should be noted that the requirement for the hourly production of polymer to change during non-steady-state operation does not preclude relatively short periods during which production may be substantially constant. However, such periods are generally of a maximum of a few hours, whereas at "steady-state" a substantially constant hourly production of polymer will generally be maintained for a number of days, such as for at least two (2) days, and often significantly longer.

In contrast, the total duration of a non-steady-state period is generally from a few hours to less than two (2) days.

The term "substantially constant" as used herein means that a parameter varies by less than +/−ten (10) percent (%) from an average over a period of time. In relation to "non-steady-state" this period of time is the non-steady-state period, whereas in relation to "steady-state" a period of forty eight (48) hours can be used. More generally, a control system may act to try to maintain a parameter at a particular value, but variations of the parameter from the set point may occur due to noise in measurements and/or delays in response of the control system, but such control is still "steady-state".

The non-steady-state operation according to the present invention comprises at least two sequences, i.e. a first sequence which takes place before catalyst introduction followed by the start-up (second sequence).

According to the present invention, and as in the art noted above, the term "start-up" refers to the period which passes between the time at which the introduction of the catalyst into the reactor is begun and the time at which a steady desired hourly production of polymer is reached ("steady state"). During start-up the hourly production of polymer is increased. As already noted more generally, it should be noted that the requirement for the hourly production of polymer to increase during the start-up phase does not preclude relatively short periods during start-up during which production may be substantially constant. Such is described, for example, in WO 99/31142. However, such periods are generally of a maximum of a few hours compared to "steady-state". In particular, the total duration of the start-up period is generally less than 2 days, whereas steady state production usually occurs for significantly longer.

The actual total duration of the start-up period can vary according to the size of the reactor. With industrial-scale reactors, it is usually between 1 hour and 48 hours, preferably between 10 and 44 hours.

The start-up period is thus preceded by a specific sequence; said first sequence takes place before catalyst introduction and consists in preparing the fluidised bed reactor comprising a charge powder
   at a reactor temperature "Tsu" lower than 90° C.,
   under a ratio of the partial pressure of hydrogen to the partial pressure of ethylene ("RHsu"), and
   under a ratio of the partial pressure of comonomer to the partial pressure of ethylene ("RCsu"),
characterised in that
   RHsu is higher than RHop, preferably higher than 1.1× RHop, and
   RCsu is higher than RCoop, preferably higher than 1.1× RCoop.

The actual duration of said first sequence can also vary according to the size of the reactor. With industrial-scale reactors, it is usually between 1 hour and 24 hours, preferably between 2 and 10 hours.

The polymerization is preferably carried out in a gas phase fluidized-bed reactor. Such reactors/processes are generally known. Examples are described in French Patent No. 2,207,145 or French Patent No. 2,335,526.

The charge powder used in the process of the present invention may consist of solid particles of an inorganic product, such as silica, alumina, talc or magnesia, or else an organic product such as a polymer or copolymer. In particular the charge powder may be a polyolefin powder preferably of the same nature as that of the polyolefin powder to be produced during steady-state. Such a charge powder may in particular originate from a previous polymerisation or copolymerisation reaction. In this way one may use as charge powder a powder of a polyethylene, preferably a copolymer of ethylene with less than 20% by weight of one or more other alpha-olefins comprising, for example, from 3 to 12 carbon atoms.

Advantageously the charge powder consists of particles having a mean diameter by mass comprised between 500 and 5000 microns, and preferably comprised between 200 and 3000 microns. The size of the charge powder particles is chosen partly as a function of the size of the polyolefin particles to be produced, and partly as a function of the type of polymerisation reactor and conditions of use of this reactor, such as for example the speed of fluidisation which may for example be comprised between 2 to 10 times the minimum speed of fluidisation of the polyolefin particles to be produced.

According to an embodiment of the present invention, the pre-start up procedure also includes a cleaning process (pre start-up operation) characterized in that, prior to the introduction of the catalytic system in the reactor, the reactor is subjected to a cleaning treatment comprising the steps of introducing into the reactor an alkane having from 4 to 8 carbon atoms, circulating said alkane across the reactor under pressure and elevated temperature, depressurizing and purging the reactor. This additional alkane treatment can lead to smooth and improved in all aspects polymerization start-ups. While not wishing to be bound to this explanation, the Applicants believe that it is the absorption capacity of the alkane which positively impacts on the polymer residues and impurities present on the reactor wall, in the piping and exchangers, so that during the depressurizing/purging steps a high desorption of these residues and impurities occur by mechanical and/or dissolution and/or azeotropic type mechanisms. This cleaning treatment consists in introducing into the reactor an alkane having from 4 to 8 carbon atoms, circulating said alkane across the reactor under pressure, depressurizing and purging the reactor. The introduction of the alkane in a fluidised bed is preferably performed in the presence of an inert gas. In particular the treatment may be performed in the presence of nitrogen. It is also preferably performed under airtight conditions in order to avoid any oxygen ingress. It is also preferably performed in the absence of reacting gas like the olefins.

For the purpose of the present description and appended claims, "under pressure" treatment means that the pressure inside the reactor is at least above the atmospheric pressure. The alkane cleaning treatment is preferably carried out under a pressure comprised between 5 and 30 bars. For the purpose of the present description and appended claims, a treatment at an "elevated temperature" means that the treatment is performed at a reactor temperature of at least 40° C., preferably performed at a temperature comprised of at least 50° C. and more preferably at a temperature of at least 70° C. Preferably, when a charge powder is present, the treatment temperature should be below the temperature at which the particles of charge powder begin to soften and form agglomerates. The alkane is for example, butane, pentane, hexane, heptane or octane. Pentane is preferably used. The quantity of alkane used according to the invention depends on the state of purity of both the reactor loop and the charge powder. Preferably, the quantity of alkane used for the treatment is such that the alkane partial pressure is comprised between 25 and 95% of the saturated vapor pressure of the said alkane under the treatment conditions (temperature and pressure). More preferably, the quantity of alkane used for the treatment is such that the alkane partial pressure is comprised between 45 and 75% of the saturated vapor pressure of the said alkane under the treatment conditions (temperature and pressure). In order to provide the most efficient cleaning treatment, it is important that this treatment should last at least five minutes and preferably over 15 minutes. Thus, this optional cleaning process includes after the alkane circulation under pressure a depressurizing step. Then, the consecutive purge operation(s) is/are performed according to techniques in themselves known, such as successive operations of pressurising and degassing the reactor by means of gases or a mixture of gases as referred to above. They may be carried out under a pressure at least equal to atmospheric pressure, preferably under a pressure comprised between 0.1 and 5 MPa, at a temperature equal to or greater than 0° C., but less than the temperature at which the charge powder particles begin to soften and form agglomerates, and preferably at a temperature of at least 40° C.

The charge powders could also be advantageously treated with alkylaluminium compounds, prior to polymerisation, in order to react with the water contained in the charge powder. Depending on the nature of the charge powder bed, the first sequence according to the present invention can also be preceded by one or more purification periods, during which the reactor is freed as far as possible from impurities, such as oxygen or water, which poison the catalyst. The purification of the reactor can be carried out as indicated in European Patent Application EP-A-0180420. For example, the reactor may additionally be treated with an organoaluminium compound of the formula AlRn X3-n in which R is an alkyl group comprising from 2 to 12 carbon atoms, X is a hydrogen or halogen atom, or an alcoholate group, and n is a whole number or fraction comprised between 1 and 3. Said organoaluminium additional treatment, if used, is preferably performed after the alkane treatment.

The organoaluminium compound, when used, may be chosen from amongst the trialkylaluminium compounds or hydries, chlorides or alcoholates of alkylaluminium. Generally it is preferred to use a trialkylaluminium such as triethylaluminium, trisobutylaluminium, tri-n-hexyl-aluminium or tri-n-octyl aluminium. In certain cases, especially with a view to simplifying the process of the invention, the organoaluminium compound may advantageously be of the same nature as that used as co-catalyst associated with the catalyst in the catalyst system.

Another additional treatment could be a dehydration treatment, which essentially consists in purge operations. If used, said additional dehydration treatment is advantageously performed before the alkane cleaning treatment.

According to a preferred embodiment of the present invention, the cleaning treatments (purges, organoaluminium compounds and alkanes) are performed before composing the reacting gas phase, i.e. before the first sequence according to the present invention.

Thus, prior to catalyst injection, i.e. prior to the start-up period, the reactor charge powder bed is heated to a temperature lower than 90° C. This particular feature according to the present invention lies in the heating of the reactor before start-up in order to reach the appropriate temperature inside the reactor before catalyst injection and start-up; said heating can be done by any appropriate mean, e. g. by using a heat exchanger in the reaction loop, said heat exchanger using the usual cooling water system with steam injection (that is based on an open loop). Whilst a closed loop pressurised water cooling system (using steam) could be used in the present invention in order to provide the adequate reactor operating temperatures before start-up, the present invention allows to operate without such a system which represents an additional advantage compared to the prior art.

During the first sequence according to the present invention, the gas phase composition of the fluidised bed reactor is controlled
under a ratio of the partial pressure of hydrogen to the partial pressure of ethylene ("RHsu"), and
under a ratio of the partial pressure of comonomer to the partial pressure of ethylene ("RCsu"),
characterised in that
RHsu is higher than RHop, and
RCsu is higher than RCoop.

According to an embodiment of the present invention, the gas phase composition of the fluidised bed reactor is controlled during the first sequence by maintaining RHsu higher than 1.1×RHop, preferably higher than 1.2×RHop, more preferably higher than 1.5×RHop, or even higher than 2×RHop.

According to an embodiment of the present invention, the gas phase composition of the fluidised bed reactor is controlled during the first sequence by maintaining RCsu higher than 1.1×RCoop, preferably higher than 1.2×RCoop, more preferably higher than 1.5×RCoop, or even higher than 2×RCoop.

According to the present invention, the completion of the first sequence (heating step and specific gas phase composition) is done before the introduction of the active polymerization catalyst specie inside the reactor. It will be apparent for the man skilled in the art that the present invention process can also advantageously be used after a shutdown of the previous polymerization process. Consequently, whilst this is not preferred, there might be residual polymerization occurring when proceeding with the first sequence according to the present invention. It is thus essential to continue to control the temperature and the gas phase composition according to the process claimed until the introduction of the catalyst specie into the reactor and the start-up polymerisation.

Then, contacting the olefins with the charge powder in the presence of the catalytic system may be performed in a manner in itself known, by means of a polymerisation or copolymerisation reactor with a fluidized bed.

Once the first sequence according to the present invention has been completed, the subsequent second sequence consists in the introduction of the catalyst system into the reactor and the increase of the ratios of the ethylene partial pressure to the hydrogen partial pressure and of the ethylene partial pressure to the comonomer partial pressure, i.e. the start-up sequence. Said sequence lasts until steady-state conditions are reached, i.e. until
the reactor temperature "T" reaches "Top", the ratio of the partial pressure of hydrogen to the partial pressure of ethylene RH reaches RHop, and the ratio of the partial pressure of comonomer to the partial pressure of ethylene RC reaches RCoop.

According to an embodiment of the present invention, the increase of the ratio of ethylene partial pressure to hydrogen partial pressure during the second sequence is performed by decreasing the hydrogen partial pressure and/or by increasing the ethylene partial pressure; it is preferably performed by increasing the ethylene partial pressure.

According to an embodiment of the present invention, the increase of the ratio of ethylene partial pressure to comonomer partial pressure during the second sequence is performed by decreasing the comonomer partial pressure and/or by increasing the ethylene partial pressure; it is preferably performed by increasing the ethylene partial pressure.

Surprisingly, it has been observed that when one wishes to attain in an advantageous manner, in a relatively short time, a stable production of polyolefin of the desired quality, it is possible thanks to the process of the invention to perform the initial stage of the polymerisation or copolymerisation in the presence of the catalytic system in a relatively large quantities, without forming agglomerates or fine particles.

The pre start-up temperature is thus lower than the desired steady-state reaction temperature. Pre start-up ratios of partial pressures of hydrogen and comonomer to ethylene values are thus higher than the desired steady-state values.

The gas mixture is passed through and fluidises a "start-up bed" of polymer, usually a bed of deactivated polymer particles from a previous reaction.

Catalyst in then injected to initiate reaction, which step marks the start of the "start-up" period.

Generally during the start-up or any other period of non-steady-state period, the partial pressures of monomer, comonomer and hydrogen in the reactor are monitored, and fresh monomer, fresh comonomer and fresh hydrogen are fed to the reactor to replace the monomer, comonomer and hydrogen consumed (by reaction to produce polymer).

The changes in production rate during the period of non-steady-state operation depend on the operation. Usually during a start-up period the production rate is increased, for example by increasing the rate of catalyst introduction, and thus the rates of feed for the fresh ethylene.

Similarly, during the period of non-steady-state operation the height of the fluidized bed may be substantially the same as that at steady-state, in which case the height of the bed is substantially constant throughout the process. Alternatively, the height of the bed can be changed during the non-steady-state operation. For example, the reaction can be started with a lower bed and the height of the bed can be increased during the start-up period, as described in WO 99/31142.

Similarly, the fluidisation velocity of the gas mixture may be substantially constant during the non-steady-state period, or the velocity may be varied. For example, on a start-up the velocity may initially be lower than desired at steady-state, and be increased during the start-up period.

The monitoring of the partial pressures can be performed by any suitable technique. The use of gas chromatographs is widely used, and is preferred.

According to the present invention, at steady-state the feed of fresh monomer to the reactor is controlled to maintain the monomer partial pressure substantially constant. However, the feed of fresh comonomer to the reactor is preferably controlled to maintain a substantially constant flow ratio of the feed of fresh comonomer to the feed of fresh monomer and the feed of fresh hydrogen to the reactor is controlled to maintain a substantially constant flow ratio of the feed of fresh hydrogen to the feed of fresh monomer.

According to this, the comonomer and/or hydrogen partial pressure in the reactor is not directly controlled and therefore may vary.

Alternatively, the control at steady-state can be based on a control of the comonomer and hydrogen based on the partial pressure of such components in the reactor.

Generally, the total pressure in the reactor at steady-state is between 0.5 and 5 MPa, preferably between 1.8 and 3.0 MPa.

The partial pressure of ethylene at steady-state is generally between 0.3 and 1.7 MPa, preferably between 0.4 and 1.3 MPa.

The partial pressure of comonomer at steady-state is generally between 0.0 and 0.8 MPa, preferably between 0.001 and 0.5 MPa.

The temperature at steady-state can generally range from 90° C., preferably 95° C., to 130° C., preferably from 100° to 120° C.

The fluidization velocity at steady-state rate can generally range from 45 to 85 cm/s. If a lower velocity is used at start-up then this may be in the range from 35 to 55 cm/s.

The monomer is ethylene. The comonomer may also be an olefin (other than the monomer) having from 3 to 10 carbon atoms.

Preferred comonomers are olefins having 4 to 8 carbon atoms. The preferred alpha-olefins are but-1-ene, pent-1-ene, hex-1-ene, 4-methylpent-1-ene, oct-1-ene and butadiene, the most preferred comonomers being the but-1-ene and hex-1-ene.

The present invention is particularly applicable to polyethylene copolymer grades of medium and high density, in particular grades exhibiting a 935 to 970 kg/m3. The melt index of said grades may vary between 0.5 and 100 (MI2).

The reaction gas mixture may generally also contain an inert gas, which is generally nitrogen and/or an alkane, for example having from 1 to 8, preferably from 2 to 6, carbon atoms, such as pentane and/or isopentane.

The space time yield, which is the hourly production of polymer per unit volume of the reactor, is relatively low at the beginning of the start-up period, but increases throughout the start-up period to reach a final value at steady state which is generally in the range 50 to 200 kg/h/m$^3$.

Catalyst may be introduced into the reactor continuously or discontinuously. Catalyst can be introduced in particular using the equipment described in French Patent No. 2,562,077 or in French Patent No. 2,705,252.

The present invention may be applied to any suitable polymerisation catalyst, but is preferably applied to a process using a Ziegler-Natta type catalyst.

A Ziegler-Natta type catalyst is understood to mean a catalyst which comprises at least one transition metal chosen, for example, from titanium, vanadium, chromium, zirconium or hafnium. This catalyst can optionally comprise a magnesium halide, such as magnesium chloride or bromide, and/or a support based on a refractory oxide, such as silica or alumina. In particular a catalyst comprising titanium and/or vanadium, halogen and magnesium atoms can be used.

It is also possible to use a metallocene-based catalyst comprising at least one zirconium, titanium or hafnium atom, such as, for example, those described in EP 129368, U.S. Pat. No. 5,324,800 and EP 206794. It is also possible to use a catalyst containing a heteroatom bonded to a monocyclopentadienyl, such as, for example, the catalysts described in EP 416815 and EP 420436.

The catalyst is in principle used in conjunction with a cocatalyst which is an organometallic compound of a metal from Groups I to III of the Periodic Classification of the Elements, such as aluminium, boron, zinc or magnesium. For example, the cocatalyst can be an organoaluminium compound, such as a trialkylaluminium or an aluminoxane. Throughout the start-up period, the introduction of cocatalyst into the reactor is advantageously carried out so as to keep the cocatalyst to catalyst molar ratio constant. This ratio is preferably between 1 and 100. However, when a metallocene catalyst is used, this ratio can range from 1:10,000 to 10,000:1.

The catalyst can be used as is or optionally in the form of a prepolymer containing, for example, from 0.1 to 200 g, preferably from 10 to 100 g, of polymer per gram of transition metal. The process of the invention is particularly suited to the use of a non-prepolymerised catalyst.

The process can also be advantageously applied with a late transition metal catalyst, i. e. a metal from Groups VIIIb or Ib (Groups 8-11) of the Periodic Table. In particular the metals Fe, Co, Ni, Ru, Rh, Pd, Os, Ir, and Pt are preferred, especially Fe, Co and Ni. The late transition metal complex may comprise bidentate or tridentate ligands, preferably coordinated to the metal through nitrogen atoms. As examples are those complexes disclosed in WO96/23010. Suitable iron and/or cobalt complexes catalysts can also be found in WO98/27124 or in WO99/12981.

It is also possible to use a high-activity catalyst consisting essentially of a chromium oxide activated by a heat treatment and associated with a granular support based on a refractory oxide.

The process of the invention is particularly well suited to industrial-scale reactors of very large size which can have an hourly production of at least 10 tonnes of polymer. The reaction gas mixture containing the monomer and comonomer to be polymerized is generally cooled by means of at least one heat exchanger arranged outside the reactor before being recycled. Following the start-up period, the polymerization reaction is advantageously carried out as indicated in French Patent No. 2,666,337.

BRIEF DESCRIPTION OF THE DRAWINGS

The invention will be illustrated with the attached figures.

EXAMPLES

Both examples have been conducted in the same conventional industrial fluidised bed reactor.

The catalyst used was a prepolymerised Ziegler type, titanium based catalyst (supported). The products made were copolymers of ethylene and butene with a melt index MI2 of 8 and a density of 958 kg/m3. Hydrogen was used as a chain transfer agent.

Figure 1:
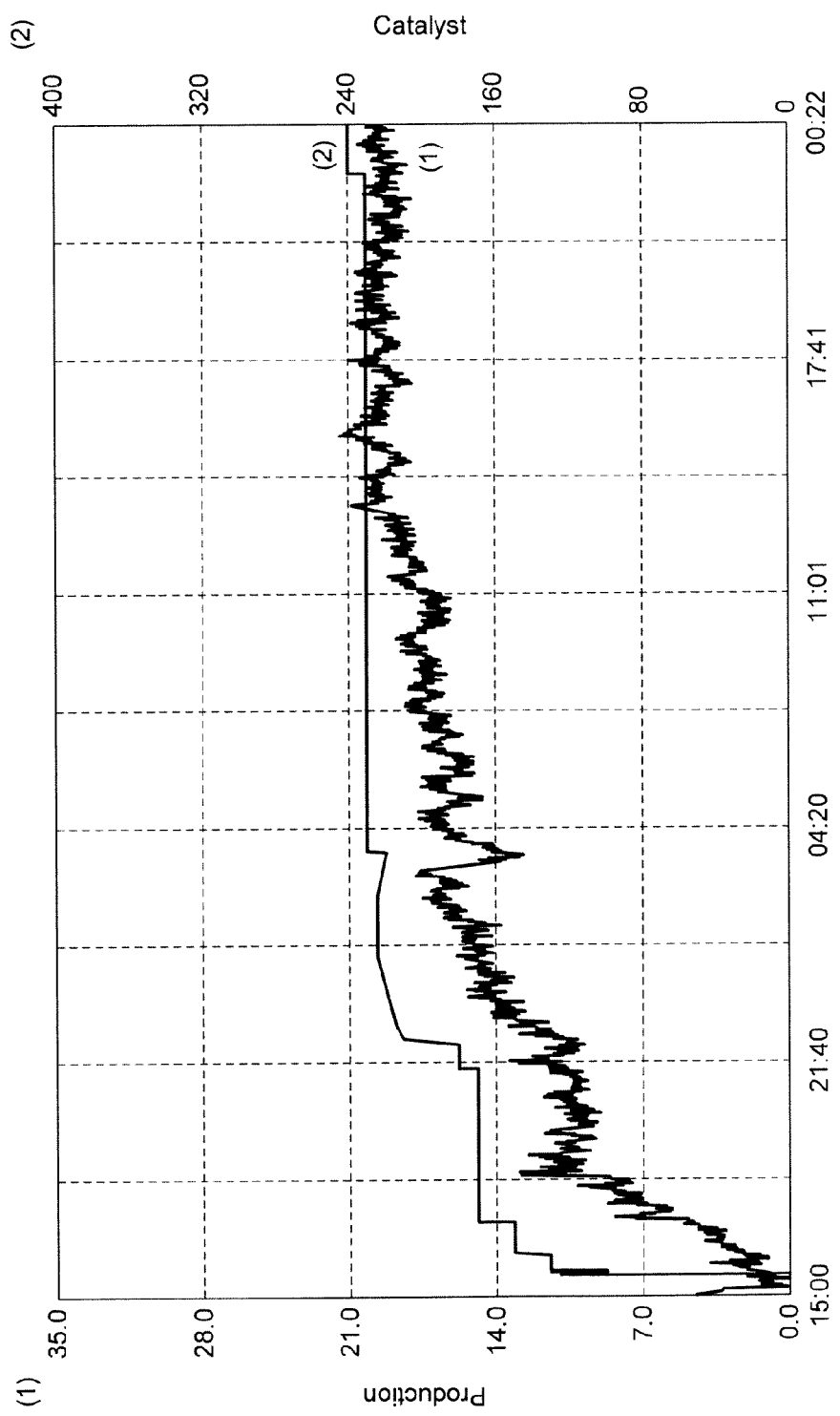
FIGS. 1 to 4 refer to example 1 which exhibits a preferred embodiment according to the present invention.
Figure 5:
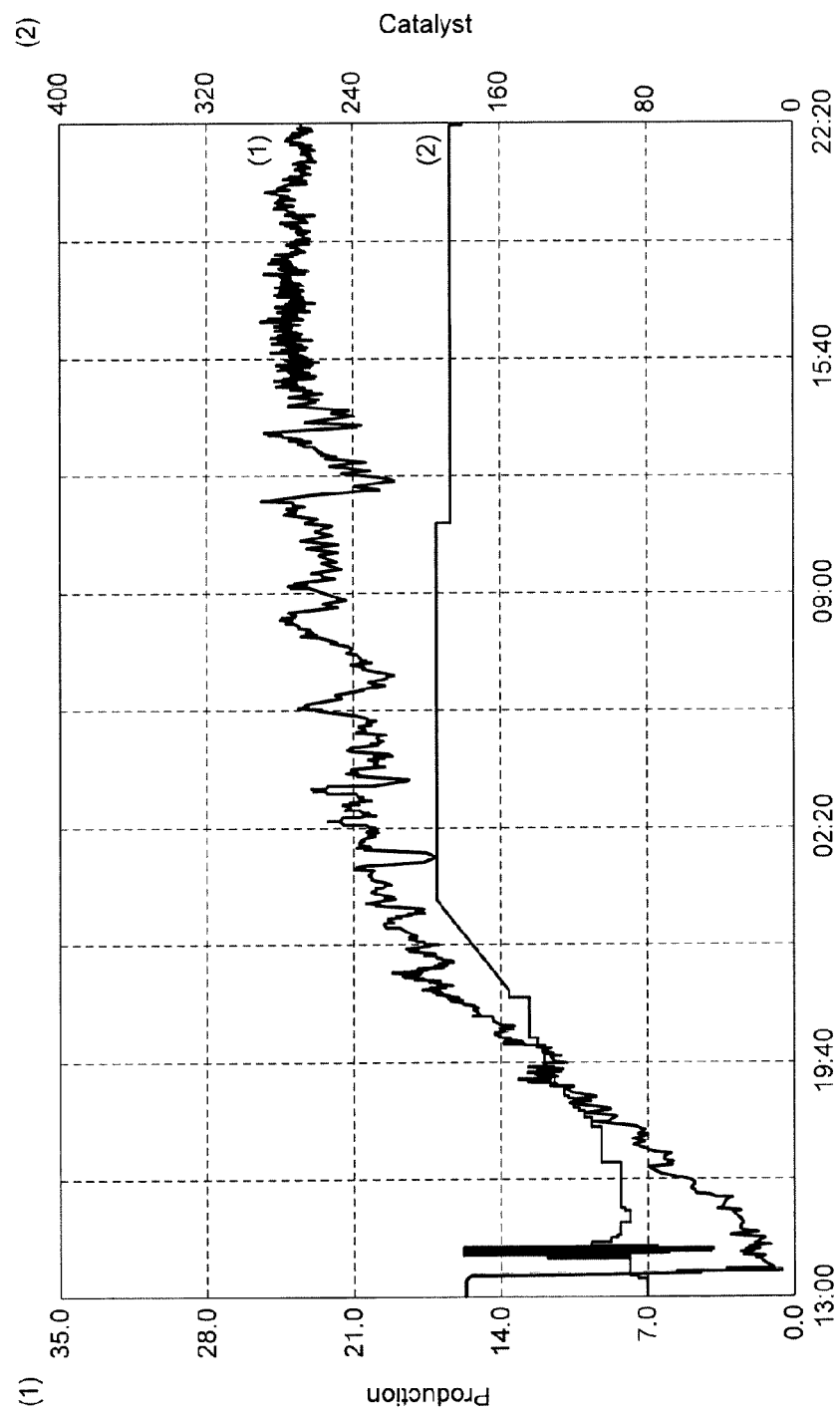
FIGS. 5 to 8 refer to example 2 which exhibits a non-preferred embodiment according to the present invention.
Figure 6:
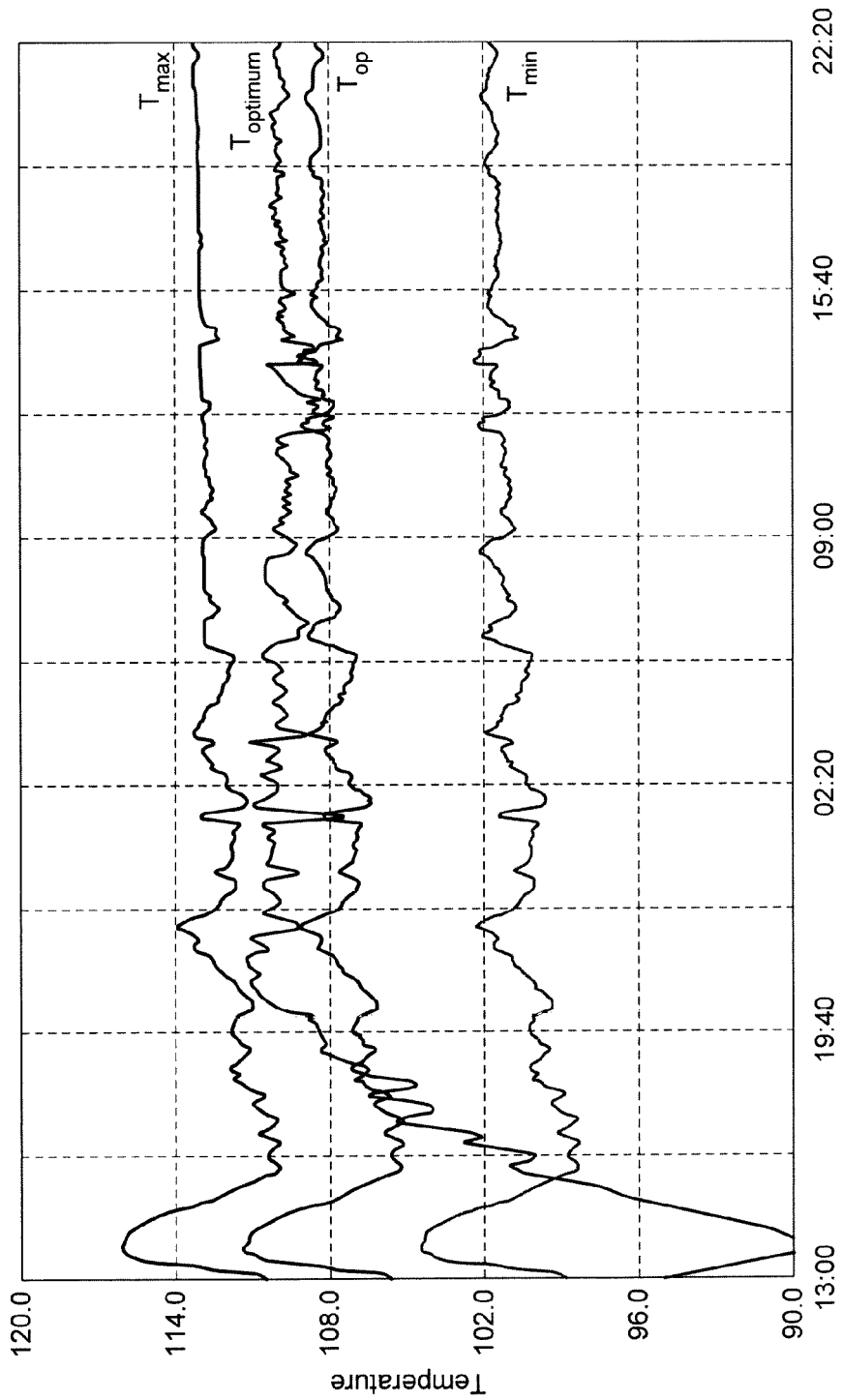

FIGS. 1 and 5 represent
the production rate in tons of polyethylene per hour (left-Y-axis) vs time and
the catalyst prepolymer injection rate in kg per hour (right-Y-axis) vs time.

Figure 3:
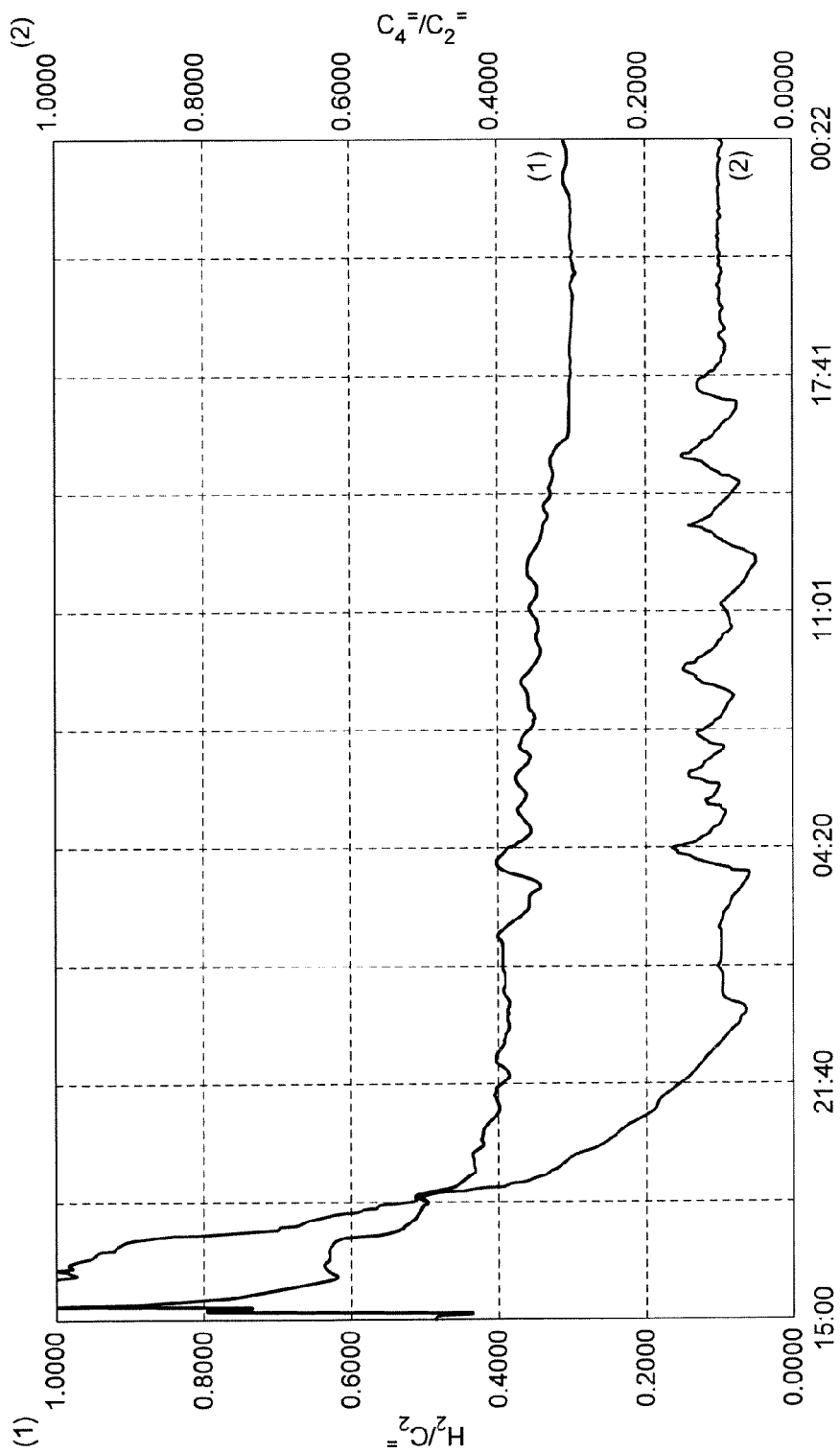
Figure 7:
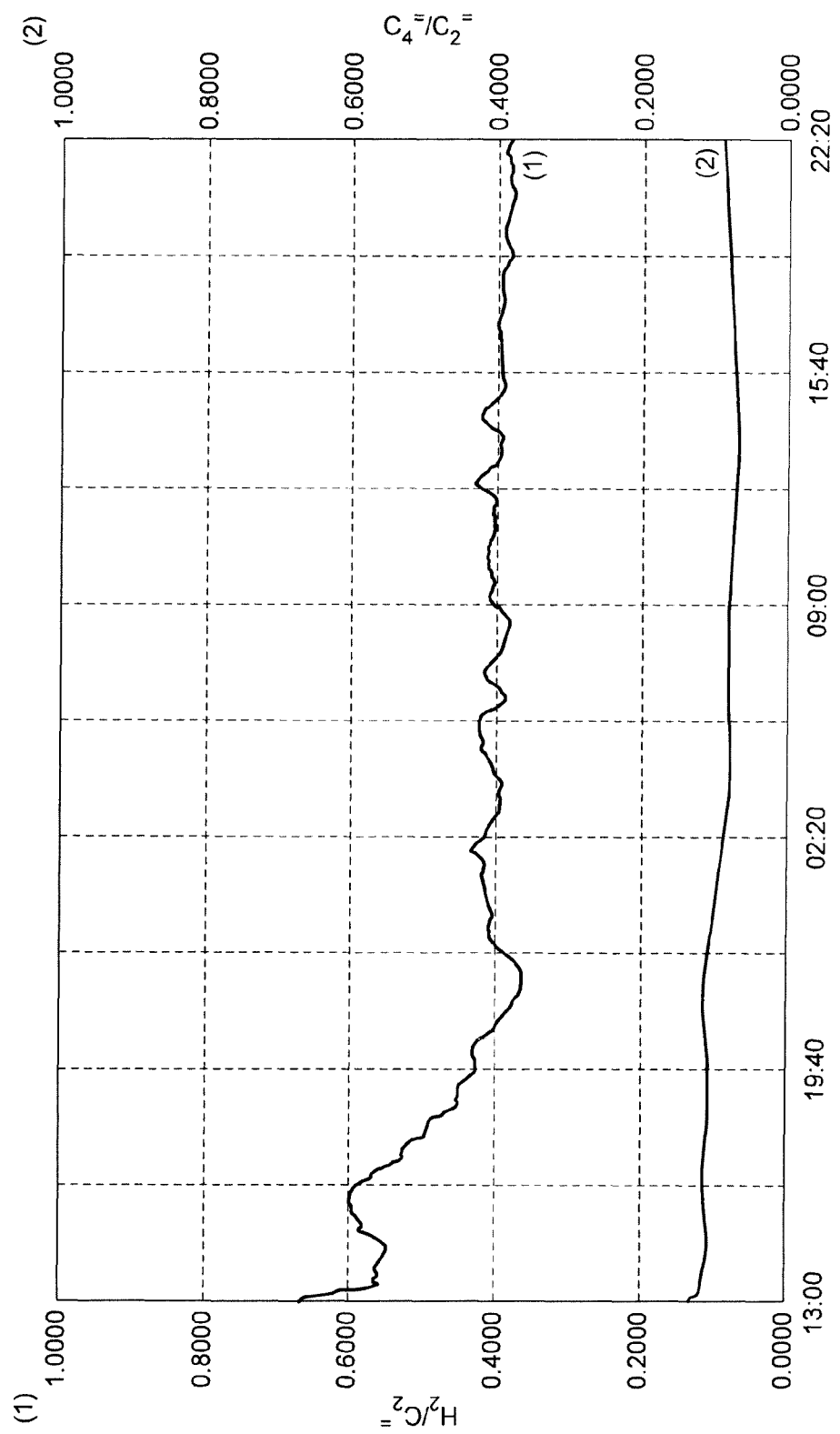

FIGS. 3 and 7 represent the partial pressure ratios of respectively hydrogen (left-Y-axis) and butene (right-Y-axis) to ethylene vs time. Example 1 (FIG. 3) represents a preferred embodiment because the initial ratios are much higher than the ratios in example 2 (FIG. 7).

Figure 4:
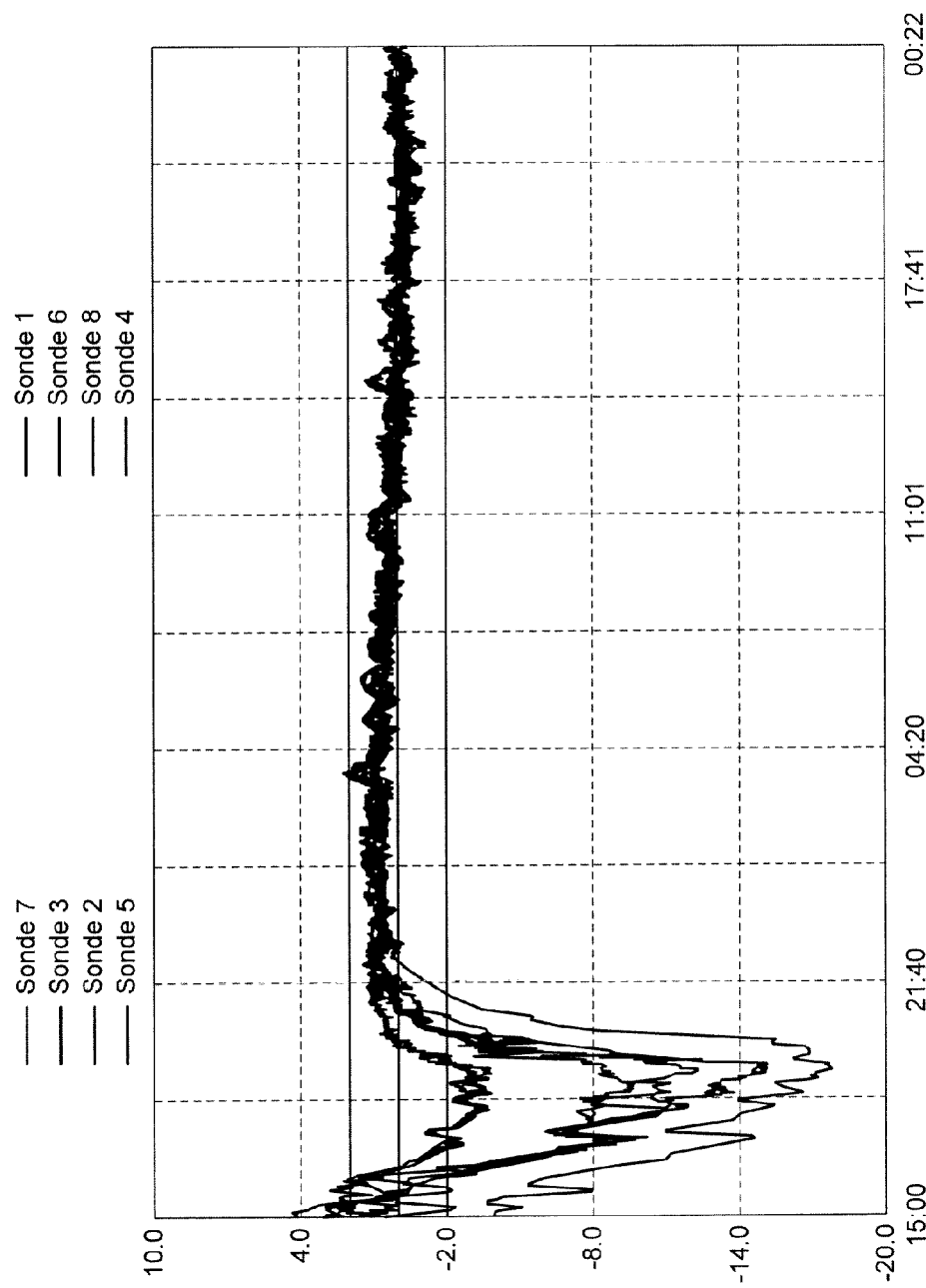
Figure 8:
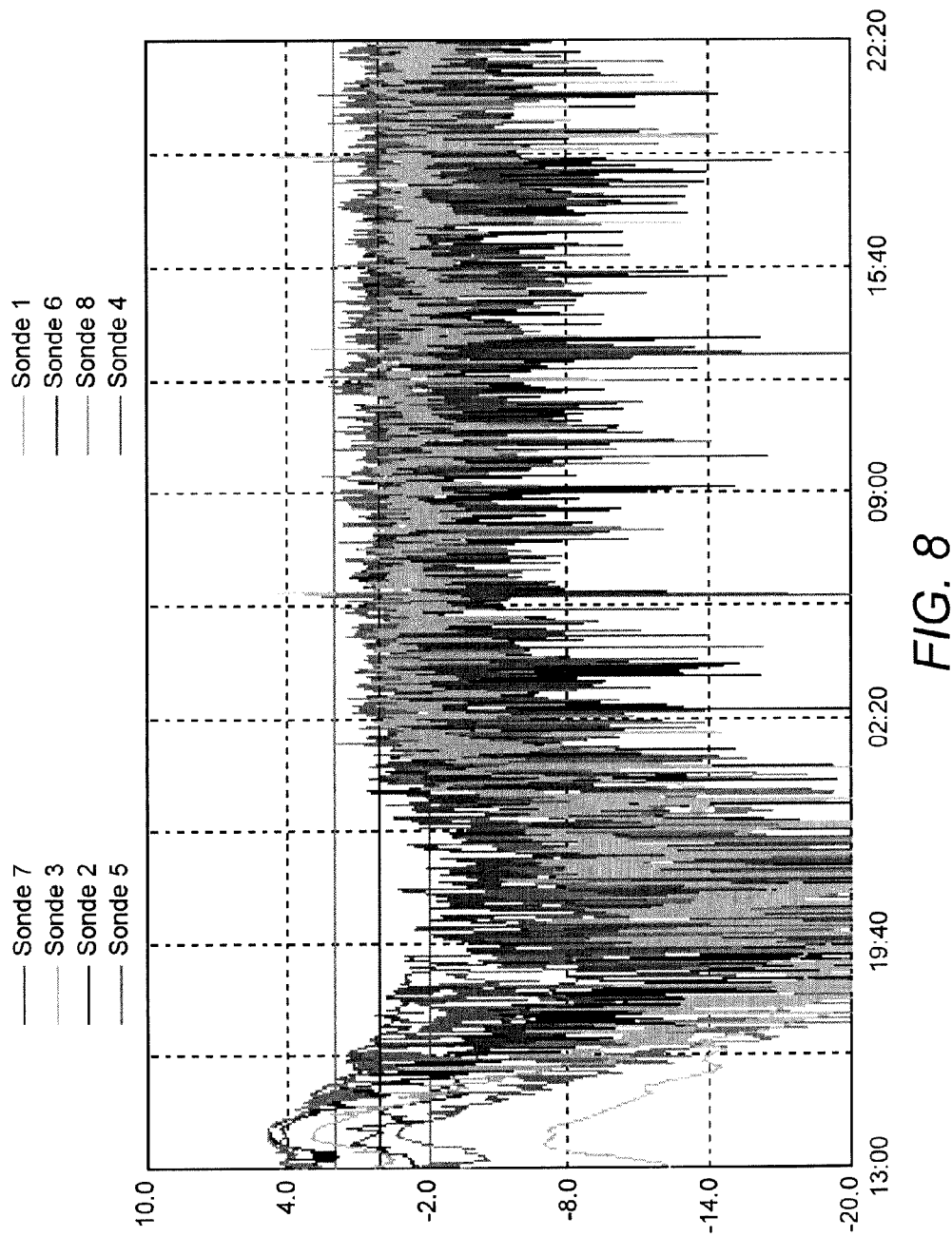

FIGS. 4 and 8 represents instantaneous temperature measurements (compared to an average baseline) performed near the fluidisation grid vs time. The amplitude of said measurements is representative of the amount of agglomerates being present in the close vicinity of the temperature probes (the agglomerates isolate the probe from the heat generated inside the reactor therefore the downward drift of the measured temperature). Again, example 1 (FIG. 4) represents a preferred embodiment because it exhibits much less amplitude than example 2 (FIG. 8).

Figure 2:
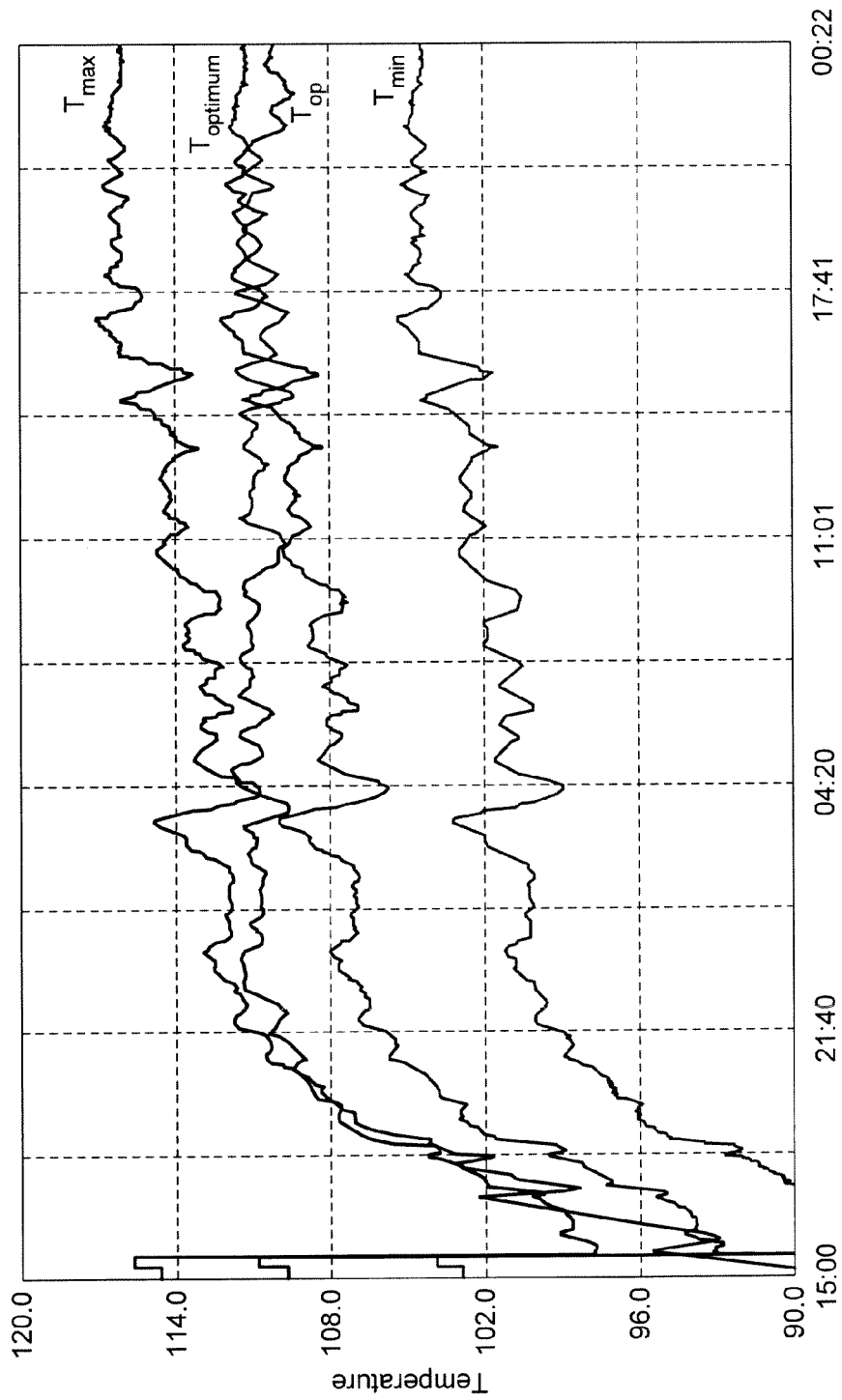

FIG. 2 (example 1) and 6 (example 2) represent the reactor temperature (Top) vs time. Whilst not wishing to be bound to this theory, the Applicants believe that the operating temperature path follows a preferential route in the invention case. Said preferential route is represented by Topt (the theoretical optimum temperature route) which is located between a theoretical minimum temperature (Tmin) and a theoretical maximum temperature (Tmax) as depicted on the figures. Again, it is clear from these two figures that example 1 represents a preferred embodiment because it follows more closely the theoretical optimum temperature route than example 2.

The invention claimed is:

1. Process for the continuous production of a medium and/or high density ethylene (co-)polymer in a gas phase fluidised bed reactor
at an operating temperature ("Top") higher than 90° C.,
under a selected ratio of the partial pressure of hydrogen to the partial pressure of ethylene ($pH_2/pC_2$="RHop"), and
under a selected ratio of the partial pressure of comonomer to the partial pressure of ethylene ($pComo/pC_2$="RCoop"),
comprising non-steady-state operations made of at least two consecutive sequences wherein the first sequence takes place before catalyst introduction and consists in preparing the fluidised bed reactor comprising a charge powder
at a reactor temperature "Tsu" lower than 90° C.,
under a ratio of the partial pressure of hydrogen to the partial pressure of ethylene ("RHsu"), and
under a ratio of the partial pressure of comonomer to the partial pressure of ethylene ("RCsu"),
wherein
RHsu is higher than RHop, and
RCsu is higher than RCoop,
and, in a subsequent second sequence, the catalyst is introduced and the ratios of ethylene partial pressure to hydrogen partial pressure and the ratio of ethylene partial pressure to comonomer partial pressure are increased until steady-state conditions, i.e.
the reactor temperature "T" reaches "Top",
the ratio of the partial pressure of hydrogen to the partial pressure of ethylene RH reaches RHop, and
the ratio of the partial pressure of comonomer to the partial pressure of ethylene RC reaches RCoop.

2. Process according to claim 1 wherein the operating temperature ("Top") is higher than 95° C.

3. Process according to claim 1 wherein RHsu is higher than 1.1×RHop.

4. Process according to claim 1 wherein RCsu is higher than 1.1×RCoop.

5. Process according to claim 3 wherein RCsu is higher than 1.1×RCoop.

6. Process according to claim 1 wherein the increase of the ratio of ethylene partial pressure to hydrogen partial pressure during the second sequence is performed by decreasing the hydrogen partial pressure and/or by increasing the ethylene partial pressure.

7. Process according to claim 3 wherein the increase of the ratio of ethylene partial pressure to hydrogen partial pressure during the second sequence is performed by decreasing the hydrogen partial pressure and/or by increasing the ethylene partial pressure.

8. Process according to claim 4 wherein the increase of the ratio of ethylene partial pressure to hydrogen partial pressure during the second sequence is performed by decreasing the hydrogen partial pressure and/or by increasing the ethylene partial pressure.

9. Process according to claim 5 wherein the increase of the ratio of ethylene partial pressure to hydrogen partial pressure during the second sequence is performed by decreasing the hydrogen partial pressure and/or by increasing the ethylene partial pressure.

10. Process according to claim 1 wherein the increase of the ratio of ethylene partial pressure to comonomer partial pressure during the second sequence is performed by decreasing the comonomer partial pressure and/or by increasing the ethylene partial pressure.

11. Process according to claim 3 wherein the increase of the ratio of ethylene partial pressure to comonomer partial pressure during the second sequence is performed by decreasing the comonomer partial pressure and/or by increasing the ethylene partial pressure.

12. Process according to claim 4 wherein the increase of the ratio of ethylene partial pressure to comonomer partial pressure during the second sequence is performed by decreasing the comonomer partial pressure and/or by increasing the ethylene partial pressure.

13. Process according to claim 5 wherein the increase of the ratio of ethylene partial pressure to comonomer partial pressure during the second sequence is performed by decreasing the comonomer partial pressure and/or by increasing the ethylene partial pressure.

14. Process according to claim 6 wherein the increase of the ratio of ethylene partial pressure to comonomer partial pressure during the second sequence is performed by decreasing the comonomer partial pressure and/or by increasing the ethylene partial pressure.

15. Process according to claim 1 wherein $RH_{su}$ is higher than $1.5 \times RH_{op}$.

16. Process according to claim 1 wherein $RC_{su}$ is higher than $1.5 \times RC_{oop}$.

17. Process according to claim 15 wherein $RC_{su}$ is higher than $1.5 \times RC_{oop}$.

18. Process according to claim 1 wherein $RH_{su}$ is higher than $2 \times RH_{op}$.

19. Process according to claim 1 wherein $RC_{su}$ is higher than $2 \times RC_{oop}$.

20. Process according to claim 18 wherein $RC_{su}$ is higher than $1.5 \times RC_{oop}$.

* * * * *